(12) United States Patent
Slavin

(10) Patent No.: US 11,412,157 B1
(45) Date of Patent: Aug. 9, 2022

(54) CONTINUOUS TARGET RECORDING

(71) Applicant: Alarm.com Incorporated, Vienna, VA (US)

(72) Inventor: Alison Jane Slavin, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 143 days.

(21) Appl. No.: 14/983,769

(22) Filed: Dec. 30, 2015

Related U.S. Application Data

(60) Provisional application No. 62/098,274, filed on Dec. 30, 2014.

(51) Int. Cl.
| | |
|---|---|
| *H04N 5/247* | (2006.01) |
| *H04N 7/18* | (2006.01) |
| *G06V 10/42* | (2022.01) |
| *G06V 20/52* | (2022.01) |
| *G06V 10/46* | (2022.01) |

(52) U.S. Cl.
CPC ........... *H04N 5/247* (2013.01); *G06V 10/42* (2022.01); *G06V 20/52* (2022.01); *H04N 7/181* (2013.01); *G06V 10/467* (2022.01)

(58) Field of Classification Search
CPC ........ H04N 7/181; H04N 7/188; H04N 5/232; H04N 5/247; G08B 13/19602; G08B 13/19645
USPC .................................................. 348/152, 159
See application file for complete search history.

(56) References Cited

U.S. PATENT DOCUMENTS

| | | | | |
|---|---|---|---|---|
| 7,116,357 | B1* | 10/2006 | Oya .................... | G08B 13/1968 348/211.8 |
| 2004/0080410 | A1* | 4/2004 | Pan .................. | G08B 13/19645 340/539.1 |
| 2004/0114054 | A1* | 6/2004 | Mansfield ........ | G08B 13/19602 348/700 |
| 2005/0007451 | A1* | 1/2005 | Chiang ............ | G08B 13/19634 348/143 |
| 2007/0035627 | A1* | 2/2007 | Cleary ............. | G08B 13/19608 348/159 |
| 2008/0198231 | A1* | 8/2008 | Ozdemir .......... | G08B 13/19608 348/159 |
| 2009/0141162 | A1* | 6/2009 | Ariga .................... | H04N 5/2251 348/341 |
| 2009/0313096 | A1* | 12/2009 | Kaga .................... | G07B 15/063 705/13 |

(Continued)

*Primary Examiner* — Kathleen V Nguyen
(74) *Attorney, Agent, or Firm* — Fish & Richardson P.C.

(57) ABSTRACT

Methods, systems, and apparatus, including computer programs encoded on a computer storage medium, for tracking objects. Actions include determining a respective field of view for a plurality of cameras within a monitored property, receiving one or more indications related to a detection of a target object by the plurality of cameras, and obtaining the respective field of views of each of the plurality of cameras. Additional actions include determining that a location of the target object is visible within the respective field of view of a first camera from among the plurality of cameras, and the location of the target object is not visible within the respective field of view of a second camera from among the plurality of cameras, obtaining a current field of view of the first camera, and providing the current field of view of the first camera for output.

24 Claims, 5 Drawing Sheets

(56) References Cited

U.S. PATENT DOCUMENTS

| | | | |
|---|---|---|---|
| 2011/0125327 A1* | 5/2011 | Sankai | H05B 47/125 700/275 |
| 2011/0167727 A1* | 7/2011 | Kamise | E05G 5/003 49/70 |
| 2012/0169882 A1* | 7/2012 | Millar | H04N 7/181 348/159 |
| 2012/0183270 A1* | 7/2012 | Greenblatt | G06F 21/34 386/224 |
| 2012/0242481 A1* | 9/2012 | Gernandt | G06K 19/0705 340/539.13 |
| 2013/0057694 A1* | 3/2013 | Petricoin, Jr. | H04N 7/18 348/155 |
| 2014/0335897 A1* | 11/2014 | Clem | G08G 1/0112 455/456.3 |
| 2015/0156423 A1* | 6/2015 | Lundberg | H04N 5/23203 348/169 |
| 2015/0163412 A1* | 6/2015 | Holley | G06K 9/00771 348/143 |
| 2015/0350848 A1* | 12/2015 | Eramian | H04W 4/90 455/404.2 |

* cited by examiner

CONTINUOUS TARGET RECORDING

CROSS-REFERENCE TO RELATED APPLICATIONS

This application claims the benefit of U.S. Provisional Patent Application No. 62/098,274 filed on Dec. 30, 2014 and entitled "CONTINUOUS TARGET RECORDING," which is incorporated herein by reference in its entirety.

TECHNICAL FIELD

This disclosure relates to tracking technology.

BACKGROUND

Tracking technologies are used for the observation of individuals and objects for particular periods of time. In security and monitoring applications, tracking technologies can be used to perform surveillance on a monitored property.

SUMMARY

Techniques are described for video camera and beacon tracking technology.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

A property monitoring system may integrate video surveillance with beacon tracking technology to allow for the tracking and video recording of a valued object.

Techniques are described for a monitoring system that integrates the use of video cameras with beacon technology to continuously track one or more target objects within a property. Multiple pan/tilt cameras perform continuous tracking of target objects throughout the property. The target object is equipped with a beacon, which is used to locate the target object. The cameras pan and/or tilt towards the detected location of the target object and capture video of the object. As the target object moves around a room within the monitored property, or moves from room to room within the property, the multiple cameras throughout the property coordinate tracking of target objects based on the detected location.

Figure 1:
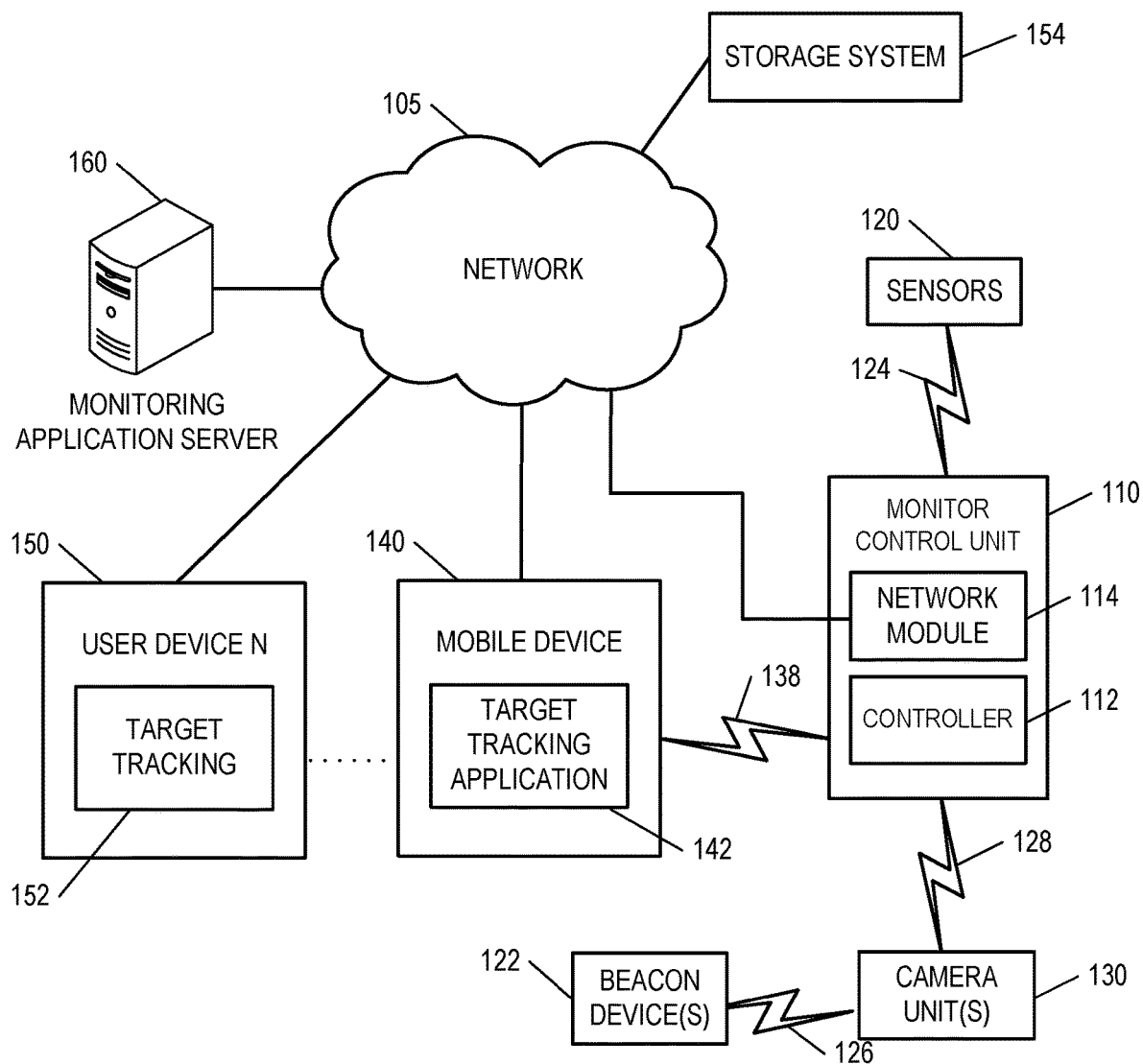
FIGS. 1 and 2 illustrate example systems for continuous target monitoring.

FIG. 1 illustrates an example of an electronic system 100 configured to provide continuous video recording of a target object. The electronic system 100 includes a network 105, a monitor control unit 110, one or more user devices 140, 150, and a monitoring application server 160. In some examples, the network 105 facilitates communications between the monitor control unit 110, the one or more user devices 140, 150, and the monitoring application server 160.

The network 105 is configured to enable exchange of electronic communications between devices connected to the network 105. For example, the network 105 may be configured to enable exchange of electronic communications between the monitor control unit 110, the one or more user devices 140, 150, and the monitoring application server 160. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or sub-networks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 includes a controller 112 and a network module 114. The controller 112 is configured to control a monitoring system (e.g., a home alarm or security system) that includes the monitor control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitor control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitor control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitor control unit 110 may include one or more sensors or detectors. For example, the monitoring system may include multiple sensors 120. The monitor control unit 110 may also communicate with multiple camera units 130. The multiple camera units may include pan/tilt cameras that are configured to video record an area within a property monitored by the monitor control unit 110. The camera may be a recording device that has a wide angle and fish eye lens to increase the field of view of the camera unit. The multiple camera units may have a night vision capability, allowing the cameras to video record even in a dim room. The multiple cameras may also be equipped with built-in microphones, speakers and/or echolocation. The multiple cameras may be designed to withstand outdoor conditions, such as extreme temperatures, and extreme weather conditions.

The camera units 130 may be in communication with one or more beacon devices 122. A beacon device 122 may transmit a signal to a camera unit 130 when the beacon is in close proximity to the camera. The camera unit 130 then may identify the location of the beacon device 122 based on the received signal. The beacon device 122 may use sonar, radar, radio frequency (RF), or any other suitable electronic communication signal to communicate with the camera units 130. For example, the beacon device 122 may transmit a sonar signal to communicate with a camera unit 130 capable of sonar communication. The beacon device 122 may be an active device, where the beacon device 122 is constantly transmitting a signal, or the beacon device 122 may be a passive device, where the device is not actively transmitting a signal, but is detectable by the camera units 130. Other components of the monitoring system may be used to detect beacon devices.

The multiple camera units 130 communicate with the controller 112 over communication link 128. The communication link 128 may be a wired or wireless data pathway configured to transmit signals from the multiple camera units 130 to the controller 112. The multiple camera units 130 may continuously transmit sensed values to the controller 112, periodically transmit sensed values to the controller 112, or transmit sensed values to the controller 112 in response to detecting the location of one or more beacon devices. The communication link 128 over which the multiple camera units 130 and the controller 112 communicate may include a local network. The multiple camera units 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The multiple camera units 130 and the storage system 154 may communicate over a local network. The storage system 154 may receive and store the video recording data received from the one or more camera units 130 via a local connection. For example, the video recordings may be communicated over the monitored property's Wireless Ethernet and stored at a local storage device, such as, a computer hard drive, a network video recorder (NVR), or a digital video recorder device (DVR). In some examples, the storage system 154 may be a remote hosted storage system, such as Amazon cloud, Apple iCloud, Google drive, Dropbox, or any other suitable remote hosted storage system. In these examples, communication is long-range over a wide area network. In some implementations, the video recording data captured by a camera unit may be stored locally at the built-in memory of the camera.

The monitoring application server 160 is an electronic device configured to provide monitoring services by exchanging electronic communications with the monitor control unit 110 and the one or more user devices 140, 150 over the network 105. For example, the monitoring application server 160 may be configured to monitor events generated by the monitor control unit 110. In this example, the monitoring application server 160 may exchange electronic communications with the network module 114 included in the monitor control unit 110 to receive information regarding alarm events detected by the monitor control unit 110. The monitoring application server 160 also may receive information regarding events from the one or more user devices 140, 150. The monitoring application server 160 may store sensor and image data received from the monitoring system and perform analysis of sensor and image data received from the monitoring system. Based on the analysis, the monitoring application server 160 may communicate with and control aspects of the monitor control unit 110 or the one or more user devices 140, 150.

The one or more user devices 140, 150 are devices that host and display user interfaces. For instance, the user device 140 is a mobile device that hosts one or more native applications (e.g., the target tracking application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a target tracking application 142. The target tracking application 142 refers to a software/firmware program running on the corresponding mobile device that enables the user to access video of a target object. The target tracking application 142 also allows the user to override the automated tracking of a target object and to control where a specific camera points. The user device 140 may load or install the target tracking application 142 based on data received over a network or data received from local media. The target tracking application 142 runs on mobile device platforms, such as iPhone, iPod touch, Blackberry, Google Android, Windows Mobile, etc. The target tracking application 142 enables the user device 140 to access video recordings from a host storage system, to edit and update user settings, and receive notifications from the monitoring system.

The user device 150 may be a general-purpose computer (e.g., a desktop personal computer, a workstation, or a laptop computer) that is configured to communicate with the monitoring application server 160 and/or the monitor control unit 110, and the storage system 154 over the network 105. The user device 150 may be configured to display a target tracking user interface 152 that is generated by the user device 150. Although FIG. 1 illustrates two user devices for brevity, actual implementations may include more (and, perhaps, many more) or fewer user devices.

In some implementations, a beacon may be placed on a target object within a monitored property and the one or more cameras located throughout the monitored property may track and continuously video record the object. A target object may be any item that a user of the monitoring system would like to continuously track. For example, the target object may be a pet, a child, another person, a valuable item, such as art work, a firearm, jewelry, furniture, a bicycle, etc., or any other suitable item associated with a monitored property. The beacon device 122 may be lightweight, small, and portable. The beacon device 122 may be easily attached to a target object.

The beacon attached to a target object may be located based on communicating with a near-by camera. The camera may receive a signal from the beacon, and the located target object may be video recorded by the camera that located the beacon attached to the object. The camera that detects the location of the beacon attached to a target object may have pan and tilt features that enable the camera to change its field of view to video record the target object. The camera may video record the target object until the object is outside of the field of view of the camera. The cameras within the monitored property may be configured to capture video recording of each location within a room. A second camera may detect the location of the beacon attached to the target object when the object moves out of the field of view of the first camera. The second camera may video record the object until the object moves out of the field of view of the second camera. The first and second cameras may be located within the same room of the monitored property, or the first and second cameras may be located in two different rooms of the monitored property. The cameras of the monitoring system may video record a detected target object as the target moves from room to room throughout the monitored property. For example, a beacon can be attached to the collar of a pet dog, and the cameras throughout the monitored property may continuously video record the dog as it moves throughout the rooms of the monitored property.

In this example, a first camera in a first room of the monitored property may detect the location of the beacon attached to the dog. The first camera may begin video recording the dog and may pan and tilt its position to continue capturing video of the dog as the dog moves around the room. The camera may have a wide angle lens to maximize the field of view of the camera. When the dog moves out of the field of view of the first camera, either by moving to a different part of the first room, or moving to a second room of the monitored property, a second camera may detect the location of the dog and video record the dog as long as it is in the field of view of the second camera.

In some implementations, one or more cameras may detect the location of the beacon attached to the dog based on each of the one or more cameras receiving a signal from the beacon. Each of the one or more cameras may receive a signal from the beacon attached to the dog based on the proximity to the beacon. The location of the beacon would be detected by any camera in the monitored property that is within a threshold signal transmission area of the beacon. The monitoring control unit 110 may receive a signal from each of the one or more cameras that detect the location of the beacon and may determine which of the one or more cameras should video record the dog. The monitoring control unit 110 may determine which of the one or more camera should video record the dog based on one or more factors. For example, the monitoring control unit may determine which camera based on the storage capability of the camera, the proximity of the camera, and/or the field of view of the camera.

The monitor control unit may determine the camera that is closest to the detected location of the beacon attached to the dog should video record the dog. In some examples, one or more cameras may detect the location of the beacon attached to the dog, however the dog may be in the field of view of only a subset of the one or more cameras that detected the location of the beacon. The monitor control unit may then make a determination of which camera should video record the dog based on the field of view of the cameras relative to the location of the dog. The monitor control unit may communicate to the determined camera to begin video recording of the dog. In some implementations, each of the one or more cameras that detect the location of the beacon attached to a target object may video record the target object when the object is in the field of view of the one or more cameras. For example, the multiple cameras in one room of the monitored property may video record a dog from different angles.

In some implementations, the cameras mounted throughout the monitored property may have wide angle lenses to allow video recording of a large area. When the location of a beacon, associated with a target object, is detected by a camera, the camera may adjust the angle of the lens, along with tilting the lens of the camera to video record the detected object. A camera may video record a target object for as long as the target object is within its field of view. The camera may have the ability to crop the view of the video recording of the location of the target object and video record the cropped area at a higher resolution and frame rate. In these implementations, as the target object moves within the field of view of the camera, the area being recorded at the higher frame rate and resolution would move along with the tracked target.

The monitored property may be equipped with multiple cameras that are mounted to the exterior walls of the property. For example, the monitored property may be a home that is equipped with cameras within the rooms of the home and cameras on the exterior of the home. The monitor control unit 110 may detect when a target object has left the monitored property. For example, a beacon device may be placed on a piece of artwork that is located on the wall of a room in the monitored property. One or more cameras in the room may detect the location of the artwork, based on a signal received from the beacon attached to the artwork. Each of the one or more cameras in the room may video record the artwork. As described earlier, the monitor control unit 110 may determine which of the one or more cameras should video record the artwork based on the proximity to each of the cameras, the field of view each of cameras, the storage capacity of the camera, or a combination of each of the factors.

In some examples, the monitor control unit 110 may determine that a specific camera video records the artwork that is stationary on a wall of a room of the monitored property. In this example, the camera may receive a signal from the beacon attached to the art work and may continuously video record the artwork. If the art work is removed from its position, the camera may pan and/or tilt its position based on the detected position of the beacon attached to the art work to attempt to continuously record the artwork. For example, if the art work falls off the wall it was mounted to, but remains in the field of view of the camera, the camera will pan and/or tilt its position to video record the artwork. The camera may capture still images of the art work. The monitor control unit 110 may determine that the location of the art work has changed and may send a notification to the mobile device of the user of the monitored property. The notification may prompt the user of the monitoring system to access the video recording to view the location of the artwork. In some examples, the notification may include a still image of the artwork captured by the camera. If the art work is removed from its position, but is no longer in the field of view of the camera, one or more other cameras within the monitored property may attempt to detect the location of the beacon attached to the art work and capture images of the art work based on detection of the beacon. For example, an intruder breaks into a monitored property and attempts to remove the art work from the monitored property. In this example, the one or more other cameras may detect the location of the beacon attached to the art work and each of the one or more other cameras may video record the art work as the intruder removes the art from the monitored property. The one or more cameras located on the exterior walls of the monitored property may also detect the location of the art work and pan and/or tilt their location to capture video recordings of the art work and/or the intruder that is removing the art work from the monitored property. In some examples, each of the one or more cameras may capture still images of the art work. The monitoring system may determine whether an alarm system associated with the monitored property is in a disarmed state. The monitoring system may trigger an alarm event based on detecting that that target object is outside of a pre-determined zone from the monitored property, and the alarm system is in a disarmed state. The monitor control unit may determine that none of the cameras associated with the monitored property are receiving signals from the beacon associated with the target object and determine that the target object is out of range and may trigger an alarm event based on the determination that the art work is out of range.

In some examples, the monitor control unit 110 may trigger an alarm event when one or more cameras on the exterior walls of the monitored property have detected the location of the beacon attached to the target object to be outside of the monitored property. In these examples, the monitor control unit 110 may communicate a notification to the mobile device of the user of the monitoring system once the art work has left its original position on the wall. The notification may include a still image of the target object, and may give the user an option to enable an alarm event.

In some implementations, the monitoring system may be integrated with global positioning system (GPS) technology to track the location of a target object that has been detected as leaving the monitored property. The GPS capability of the beacon device may be switched on when the monitoring system detects that a target object is outside of a pre-determined distance from the monitored property. The beacon device may include a device that is equipped with GPS technology. For example, if a pet dog leaves the monitored property and gets lost, the user may have the ability to track the location of the dog based on the GPS location. In these implementations, the monitoring system may switch from GPS tracking to local tracking when the target object is back within the monitored property.

In some implementations, a user associated with the monitoring system may create a monitoring schedule. The user of the monitoring system may log into a web application of the monitoring system to list, create and/or edit a monitoring schedule. The user may access the web application from an electronic device, for example, a smart phone, a laptop, a desktop, or any other electronic device. The user may have the ability to set a time period when the monitoring system should be active and when the system should be deactivated. The user may have the ability to set schedules for individual target objects. For example, the user may select to track the cat and dog from 7 am-6 pm Monday to Friday while the user is at work and the user may track art work 24 hours, 7 days a week.

In some implementations, the monitoring system may automatically activate and deactivate the tracking of a target object based on the detected presence of a user. For example, the monitoring system may automatically stop tracking the cat when the user is in the monitored property. The monitoring system may detect the presence of the user based detecting a beacon worn by the user, for example, a uniquely identifiable beacon attached to the wrist of the user, or mobile device of the user. In some implementations, the monitoring system may detect the presence of a user based on detecting a mobile device of the user by GPS. The user may have the ability to edit the activation and deactivation rules by accessing the target tracking application on a mobile device or by accessing the monitoring system through the web. The user may specify times for tracking specific target objects, specific cameras to turn on and off, and specific times to activate and deactivate the monitoring system.

The monitor control unit 110 may send a notification to the mobile device of a user of the monitored property. The notification may identify the one or more cameras at the monitored property that detected the location of a target object. For example, when the target object is a pet dog, the notification may include a summary of the rooms of the monitored property visited by the dog and the length of time of time the dog stayed in each room. The notification may be sent to the user device of the user on a periodic basis, for example, every two hours.

The monitoring system may continuously track and video record one or more target objects. The user may have the ability to prioritize the target objects so the monitoring system can determine which target object to video record if each of the one or more targets cannot be recorded at the same time. In this regard, the user may identify one or more target objects that he/she would like to track and video record continuously, for example, two pet cats. A beacon may be attached to each of the two cats and the one or more cameras throughout the monitored property may video record the cats as they move through the property. The location of the cat with the higher priority may be video recorded when both cats are in one room that is equipped with one camera. For example, one cat may be an elderly cat that the user would like to keep a closer eye on, whereas the second cat may be a younger healthier cat. The camera may receive a signal from the beacons associated with each of the cats and locate each of the cats. The camera may attempt to pan/and or tilt to cover both cats in the field of view of the camera, however, if the field of view of the camera cannot include both of the cats, the camera will focus on and video record the elderly cat with the higher priority. The camera will pan and/or tilt to get the elder cat with the higher priority into the field of view of the camera. The user of the monitoring system may log into a web application of the monitoring system to list and/or edit the prioritized list of target objects associated with the monitored property. The user may access the web application from an electronic device, for example, a smart phone, a laptop, a desktop, or any other electronic device.

Figure 2:
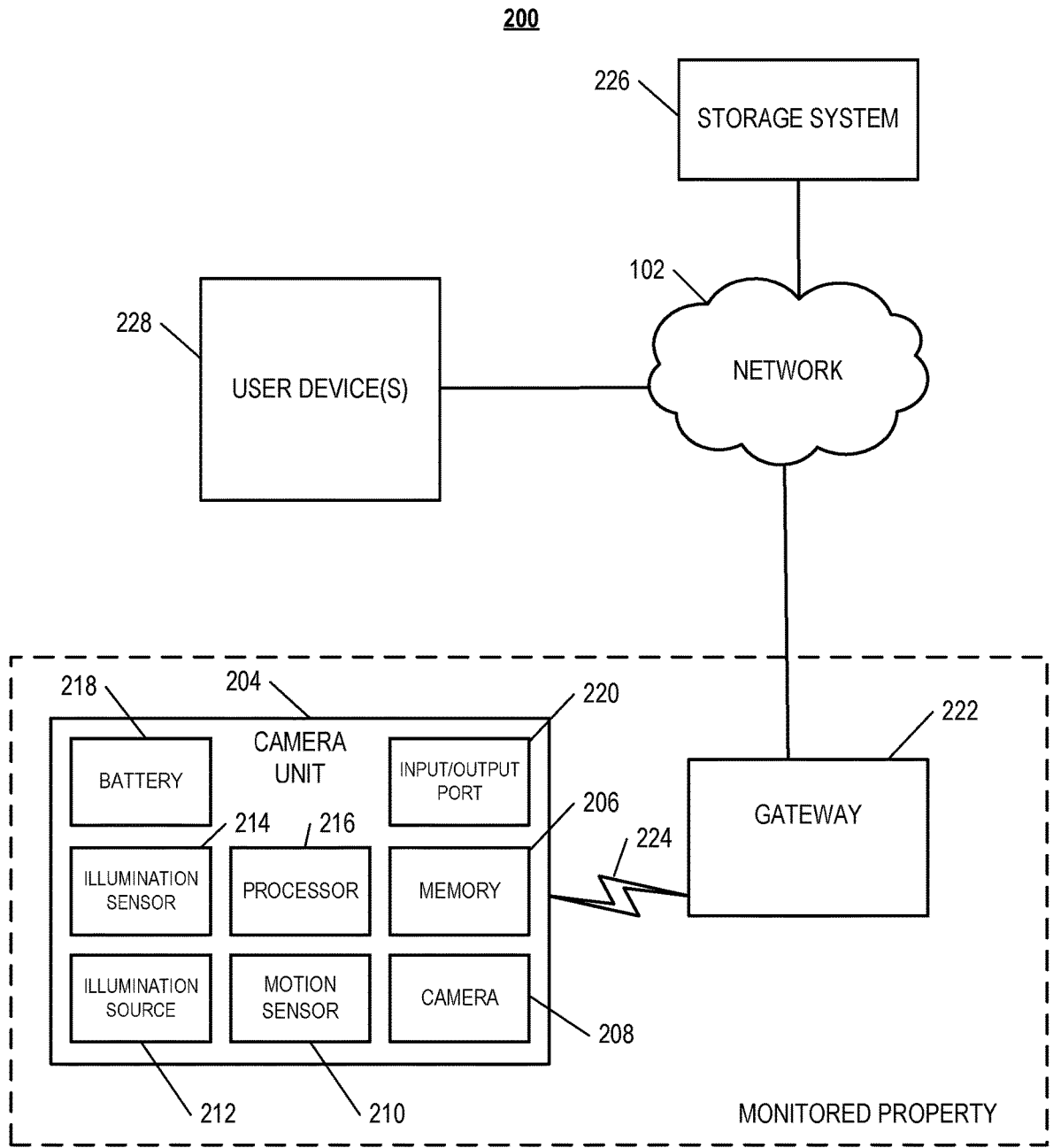

FIG. 2 illustrates an example of an electronic system 200 configured to provide video recordings to one or more user devices associated with a monitored property. The system 200 includes a camera unit 204, a gateway 222, a storage system 226, and one or more user devices 228. The camera unit 204 is a relatively small and affordable unit that captures video recordings of a target object that is equipped with a beacon. Because the camera unit 204 is relatively small, runs off of battery power, and communicates via a wireless communication protocol, the camera unit 204 may be easily placed at any location within a monitored property (or just outside of a monitored property) to provide video recording data of a target object as it moves through the monitored property (or an area just outside of the monitored property). The camera unit 204 may have pan and tilt capabilities that enable the camera unit 204 to track a moving target object and capture video over a wide range.

The camera unit 204 includes a processor 216, memory 206, a camera 208, an illumination source 212, a motion sensor 210, an illumination sensor 214, a battery 218, and an input/output port 220. The processor 216 controls operations of the camera unit 204 and may be any suitable processor. The memory 206 stores instructions that are executed by the processor 216 and also stores video captured by the camera 208. The memory 206 may be any type of memory that is capable storing data and may include a combination of multiple, memory units. For example, the memory 206 may be a Flash memory component that stores both instructions that are executed by the processor and images captured by the camera 208.

The camera 208 may capture video of a detected target object. For instance, a beacon attached to a target object may transmit a signal to the camera that allows the camera to detect the location of the beacon and triggers the camera to record the located object. The camera 208 may be a video/photographic camera or other type of optical sensing device configured to capture images. In some implementations, the camera may have the ability to crop the view of the video recording of the location of the target object and video record the cropped area at a higher resolution and frame rate. In these implementations, as the target object moves within the field of view of the camera, the area being recorded at the higher frame rate and resolution would move along with the tracked target.

In some implementations, the camera unit 204 may have a built-in microphone. In these implementations, the processor 216 may control camera 208 to begin recording video when the microphone detects sound. The processor 216 may control the camera to record when the microphone detects sound levels that are higher than a user set noise threshold level. The camera may record video even if a target object is not in the field of view of the camera. The processor may control the camera to stop recording when the microphone detects the sound levels to be within the user set threshold level.

In some implementations, the camera unit 204 may have built-in speakers. In these implementations, the user may have the ability to access the speakers and speak through a speaker in real time. For example, where the target object is a pet dog, the user may select, through the target tracking mobile application, a camera with a speaker to speak through. The user may voice record a message through the mobile application and the voice message may be played back through the user selected speaker. The user can, for example, call the dog to a particular room of the monitored property. In some implementations, the speaker may be programmed by the user to automatically sound pre-recorded messages at user scheduled times. For example, where the target object is a child, the user may select a speaker to sound a recorded message of the mother of the child singing a happy song. In some implementations, the speaker may be programmed by the user to sound a pre-recorded message when a trigger event is detected. For example, when the microphone detects high sound levels due to the target dog barking, the speaker may sound a pre-recorded message from the owner.

The illumination source 212 may be any source of illumination that improves capturing of video in a dark area. For example, the illumination source 212 may include one or more Infra Red LEDs that emit Infra Red light over an area within a field of view of the camera 208 to illuminate target objects within the area. The processor 216 may control the illumination source 212 to emit light when the illumination sensor 214 detects a level of light that is below a threshold level. In some implementations, the monitored property may include recessed lights that are located in areas surrounding a mounted camera unit. In these implementations, when the illumination sensor 214 detects a level of light that is below a threshold level, the processor at the camera unit 204 may communicate with a monitor control system, as illustrated in FIG. 1, to automatically switch on lights in the area of the camera.

The motion sensor 210 may be Passive Infra Red (PIR) motion sensor, a microwave motion sensor, or any type of sensor that detects motion in an area corresponding to a field of view of the camera 208. The processor 216 may monitor output of the motion sensor 210 and trigger the camera 208 to capture video in response to the motion sensor 210 detecting motion in the area corresponding to the field of view of the camera 208.

The battery 218 is the power source of the camera unit 204 and may be any type of battery capable of delivering power to the camera unit 208. The battery 218 may have a relatively small size and may be a standard type of battery available for purchase at retail stores. The battery 218 may be located in a compartment that is easily accessible to a user of the camera unit 208 to facilitate changing of the battery 218, which may occur relatively frequently (e.g., every couple of months) depending on the power consumption and image capture settings of the camera unit 204. The input/output port 220 is a communication interface through which the camera unit may send and receive wireless communications. The input/output port 220 may, using a short range wireless protocol (e.g., Bluetooth, Z-Wave, ZigBee, local wireless 900 MHz communication band, etc.), receive and send short range wireless communications with other devices, such as the gateway 222. The gateway 222 is a communication device configured to exchange short range wireless communications with the camera unit 204 over the communication link 224.

The storage system 226 may store video recording data received from the camera unit via the network. In some implementations, the video recording data may be received via a local connection. For example, the video recordings may be communicated over the monitored property's Wireless Ethernet and stored at a local storage device, such as, a computer hard drive, a network video recorder (NVR), or a digital video recorder device (DV). In some implementations, the storage system 226 may be a remote hosted storage system. The storage system may be hosted at a location that is remote to the monitored property. For example, video recordings may be stored using Amazon cloud, Apple iCloud, Google Drive, Dropbox, or any other suitable hostage system.

In some implementations, the video recordings stored at the storage system 226 may be accessed by a user associated with the monitored property on a user device 228. The user may access the video recording through the web, or through the mobile target tracking application on a mobile device. The video data may be communicated to the user device via the network 102. In some implementations, the video data may be accessed by a user through hosted software on a desk top PC or MAC computer.

Figure 3:
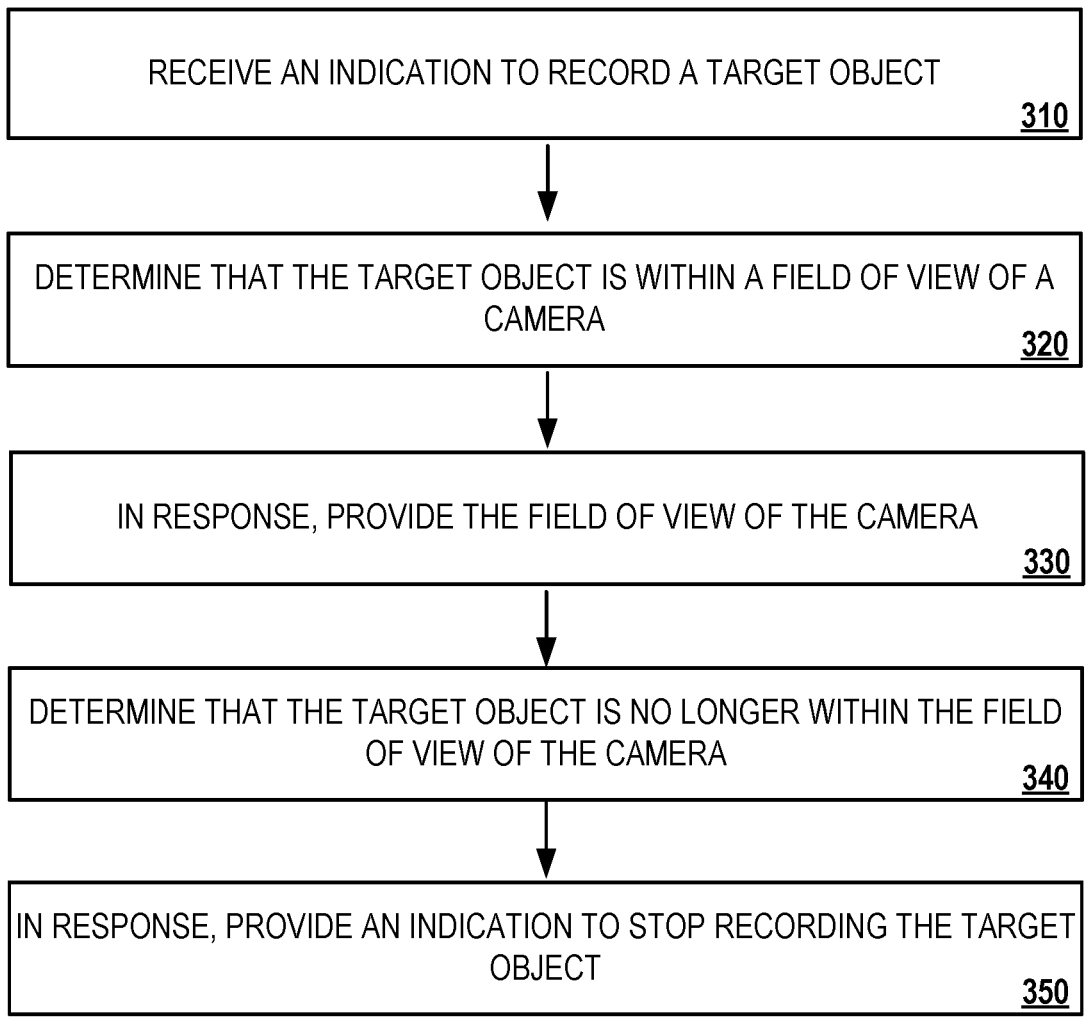
FIG. 3 illustrates an example process for determining recording based on the location a target object.

FIG. 3 illustrates an example process 300 for determining recording behavior based on the location a target object. Briefly, the process 300 may include receiving an indication to record a target object (310), determining that the target object is within a field of view of a camera (320), providing the field of view of the camera (330), determining that the target object is no longer within the field of view of the camera (340), and providing an indication to stop recording the target object (350).

In more detail, the process 300 may include receiving an indication to record a target object (310). For instance, the monitor control unit 110 may receive an indication to record a target object. In some examples, the indication to record the target object may be transmitted from the sensors 120 in response to detecting a signal indicating the presence of the target object. In such examples, the sensors 120 may transmit the detected signal indicating the presence of the target object based on movement data, heat signatures, sound data, or other types of sensor information. In other examples, the indication to record the target object may be transmitted from the beacon device 122. In such examples, the beacon device 122 can transmit a proximity-based signal based on being within a threshold distance from either the multiple camera units 130 or the sensors 120. In yet another example, the indication to record the target object may be transmitted by one of the camera units 130 in response to determining that the target object has moved.

In some instances, the indication to record the target object may be provided in response a set of monitoring parameters that provide information associated with the target object. For example, in some instances, the set of monitoring parameters may include a user-submitted picture of the target object that the camera units or monitor control unit 110 may use to determine based on image recognition whether the target object in the user-submitted picture is recognized in images obtained from the camera units. In other instances, the set of monitoring parameters may include identifying information associated with the beacon device 122 such that the monitoring parameters enable the detection of the target object based on identifying the beacon device 122. In such instances, the beacon device 122 is attached to the target object and used to monitor the location of the target object.

The process 300 may include determining that the target object is within a field of view of a camera (320). For instance, the monitor control unit 110 may determine that the target object is within a field of view of at least one of the multiple camera units 130. In some examples, the monitor control unit 110 periodically monitors each of the respective field of views of the multiple camera units 130. In such examples, the monitor control unit 110 may scan the field of view for expected visual attributes associated with the target object (e.g., object shape, object color, object indicators, etc.). In addition, the monitor control unit 110 may then determine that the target object is within a field of view of at least one of the multiple cameras 130 based on detecting the presence of the expected visual attributes associated with the target object.

In some implementations, the monitor control unit may use image recognition techniques to determine that the target object is within the field of view of at least one of the multiple cameras 130. For instance, the image recognition techniques may include performing a feature extraction of the field of view to characterize objects within the field of view. In other instances, image recognition techniques may include pixel-wise operations such as contrast enhancement, local operations such as edge extraction or noise removal, or geometric transformations such as image rotation. In such instances, such operations may be used to adjust the field of view to improve target object detection.

In other implementations, the monitor control unit 110 may determine that the target object is within a field of view of at least one of the multiple camera units 130 based on determining a location of the target object based on signals transmitted be a beacon attached to the target object and determining whether the determined location is within a field of view determined for each camera.

The process 300 may include providing the field of view of the camera (330). For instance, in response to determining that the target is within the field of view of at least one of the multiple cameras 130, the monitor control unit 110 may provide the field of view of the at least one of the multiple cameras 130. In some examples, the monitor control unit 110 may transmit a signal to the at least one of the multiple cameras 130 to initiate recording of the field of view. In other examples, the monitor control unit 110 may transmit a signal to initiate a video or image capture of the field of view, which is then stored. In such examples, the captured field of view may either be stored on the camera or a separate storage device that is configured to the system 100. The monitor control unit 110 may transmit the signal to only the cameras of the multiple cameras 130 for which the target object is determined to be in the field of view of the camera.

The process 300 may include determining that the target object is no longer within the field of view of the camera (340). For instance, the monitor control unit 110 may determine that the target object is no longer within the field of view of the at least one of the cameras 130. In some examples, as described above, the determination may be made based on detecting that a particular visual indicator associated with the target object is no longer present within the field of view of the at least one of the cameras 130 that was previously determined to include the target object. In another example, a determination may be made that a location determined for the target object based on a beacon attached to the target object corresponds to a location that is not within a field of view corresponding to any of the cameras 130.

The process 300 may include providing an indication to stop recording the target object (350). For instance, in response to determining that the target object is no longer within the field of view of the at least one of the multiple cameras 130, the monitor control unit 110 may transmit a signal to the at least one of the multiple cameras 130 to stop recording the field of view. The monitor control unit 110 may determine the cameras 130 to receive the indication to stop recording based on determining the cameras that the monitor control unit 110 transmitted a signal to begin recording and providing the indication to only those cameras.

In some implementations, the actions performed by the monitor control unit 110 during the process 300 may additionally or alternatively be performed by the multiple camera units 130. For example, one of the multiple camera units 130 may transmit a request to the other camera units to receive and store the respective field of views of the other cameras. The camera unit may then receive information associated with the target object that indicates monitoring parameters for continuous target monitoring. The camera unit may then continuously monitor the target object based on the respective field of views of the other camera units and the received monitoring parameters.

In some implementations, the multiple camera units 130 are capable of determining a movement direction of the target object based on the determining the displacement of the beacon device 122 over a particular period of time. For instance, the multiple camera units 130 may periodically determine a coordinate location of the beacon device 122 within a monitored property, and correlate the determined coordinate locations over the particular period of time to identify movement patterns. In some implementations, the identified movement patterns may be used to predict when the target object is entering or exiting respective field of views associated with the multiple camera units 130. In this regard, the identified movement patterns of the target object may be used to dynamically switch between the multiple camera units 130 while continuously monitoring the target object. Accordingly, a camera unit may receive a signal to begin recording even before the target object is in the field of view of the camera unit if the target object is predicted to soon enter the field of view of the camera unit.

Figure 4A:
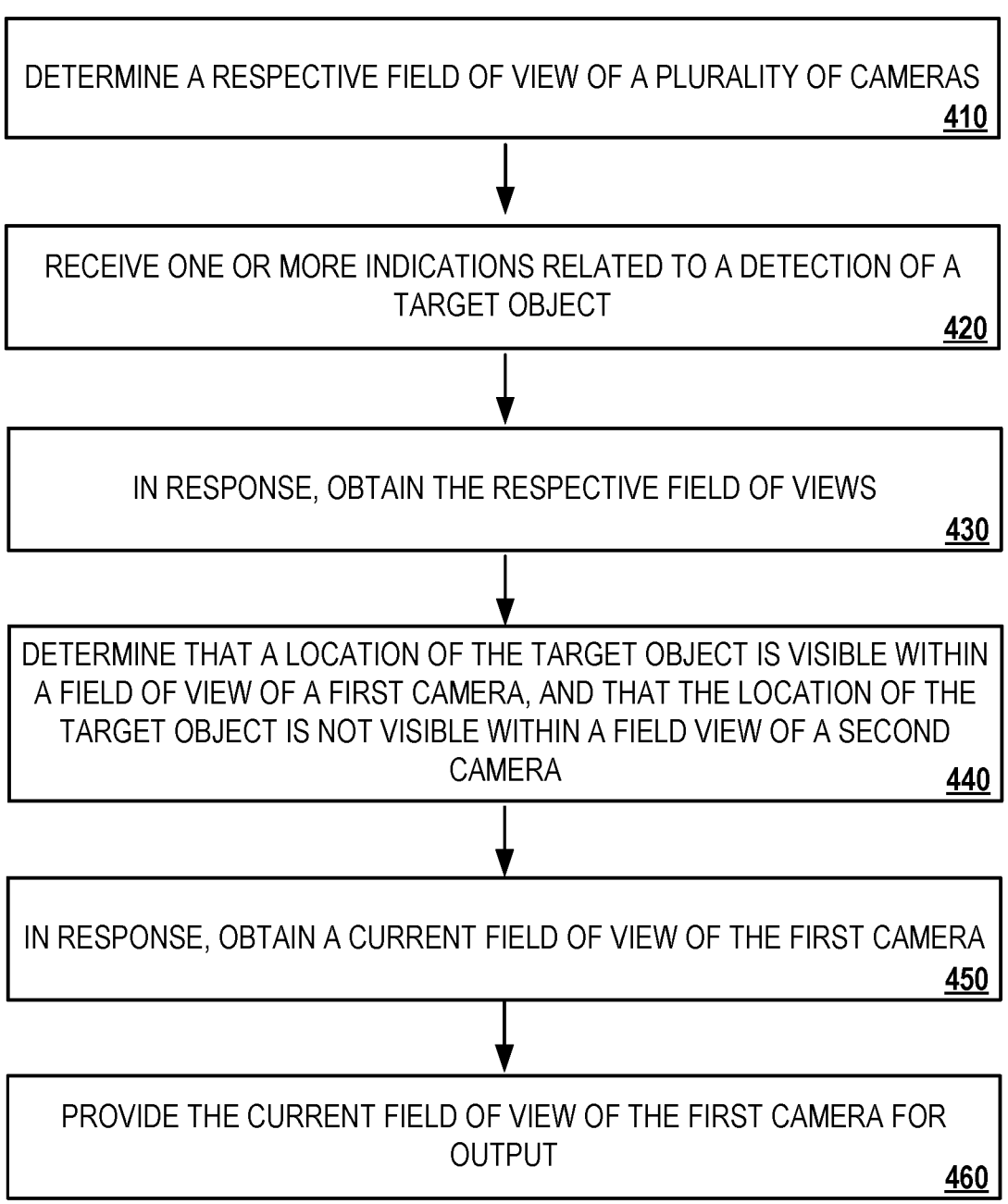
FIG. 4A illustrates an example process for continuous target recording.

FIG. 4A illustrates an example process for continuous target recording. Briefly, the process 400A may include determining a respective field of view of a plurality of cameras (410), receiving one or more indications related to a detection of a target object (420), obtaining the respective field of views (430), determining that a location of the target object is visible within a field of view of a first camera, and that the location of the target object is not visible within a field of view of a second camera (440), obtaining a current field of view of the first camera (450), and providing the current field of view of the first camera for output (460).

In more detail, the process 400A may include determining a respective field of view of a plurality of cameras (410). For instance, the monitor control unit 110 may determine a respective field of view for each of the multiple cameras 130. In some examples, the monitor control unit 110 may periodically monitor video or image data collected by the multiple cameras 130, parse the data collected, and determine the field of view within the data collected. In another example, the monitor control unit 110 may determine an orientation of a camera based on user input and determine pan and tilt ability of the camera to determine the field of view of the camera. The determined field of views may be stored for later use.

The process 400A may include receiving one or more indications related to a detection of a target object (420). For instance, the monitor control unit 110 may receive one or more indications related to the detection of the target object based on data collected by either the sensors 120, the beacon device 122, or the multiple camera units 130. In some examples, the indications may be sensor data collected by the sensors 120 indicating the presence of the target object within the monitored property. In other examples, the indications may be transmissions from the beacon device 122 in response to a proximity-based connection between the beacon device 122 and one of the multiple camera units 130. In such examples, the beacon device 122 may transmit an indication that the target object is within a particular distance from one of the multiple camera units 130. In yet other examples, the multiple camera units 130 may detect the target object based on detecting proximity of the beacon device 122.

The process 400A may include obtaining the respective field of views (430). For instance, in response to receiving one or more indications related to the detection of the target object, the monitor control unit 110 may obtain the respective field of views of the multiple camera units 130. For example, the monitor control unit 110 may access the field of view information previously determined and stored (410).

The process 400A may include determining that a location of the target object is visible within a field of view of a first camera, and that the location of the target object is not visible within a field of view of a second camera (440). For instance, the monitor control unit 110 may analyze the respective field of views of each of the multiple camera units 130 to determine if each respective field of view includes the presence of the target object. For example, as described previously with respect to FIG. 3, the monitor control unit 110 may determine a location of the target object based on signals from the beacon device 122 and determine which the fields of views include the determined location.

In some examples, the monitor control unit 110 may determine that the location of the target object is visible within one camera unit from among the multiple camera units 130. In such examples, the monitor control unit 110 may determine that the target object is not visible to the other camera units of the multiple camera units 130. In this regard, the monitor control unit 110 may designate a particular camera unit to perform continuous monitoring of the target object as the target object moves throughout the monitoring property.

Alternatively, in other examples, the monitor control unit 110 may determine that the location of the target object is visible within multiple camera units from among the multiple camera units 130 (e.g., multiple cameras with overlapping field of views). In such examples, the target object is visible to a subset of multiple camera units 130 from the multiple camera units 130, but not visible to the other camera units of the multiple camera units 130. In this regard, the monitor control unit 110 may designate multiple camera units to perform continuous monitoring of the target object as the target object moves through respective field of views of different camera units.

The process 400A may include obtaining a current field of view of the first camera (450). For instance, in response to determining that a location of the target object is visible within a field of view of a camera unit from among the multiple camera units 130, the monitor control unit 110 may obtain a current field of view of the camera unit. For example, the current field of view represents real-time optical data collected by the camera unit. The collected optical data may include, for example, a monitoring video or image feed collected by the camera unit, spatial information associated with objects included within the video or image feed, or other types of sensor data including visual information within the respective field of view.

The process 400A may include providing the current field of view of the first camera for output (460). For instance, the monitor control unit 110 may provide the current field of view of the camera unit for output to either the monitoring application server 160 or the one or more user devices 140, 150. For example, the current field of view may be used to monitor the current location of the target object within the property over periods of time when an individual associated with the monitored property is not home.

In some implementations where the target object moves through the property (e.g., a valuable object being stolen, a dog, or cat), the current field of view that is provided by the monitor control unit 110 may vary based on the current location of the target object. For instance, the monitor control unit 110 may iteratively determine whether the location of the target object is visible within the respective field of view of each of the multiple camera units 130. In such instances, if the target object moves between different respective field of views, the current field of view that is provided to either the monitoring application server 160 or the one or more user devices 140, 150 may be time-dependable and correlated with the movement of the target object within the monitored property. As described above in relation to process 300, process 400A may similarly be performed by one or more camera units instead of a monitor control unit and may similarly also record based on whether a target object is predicted to enter a field of view of a camera unit.

Figure 4B:
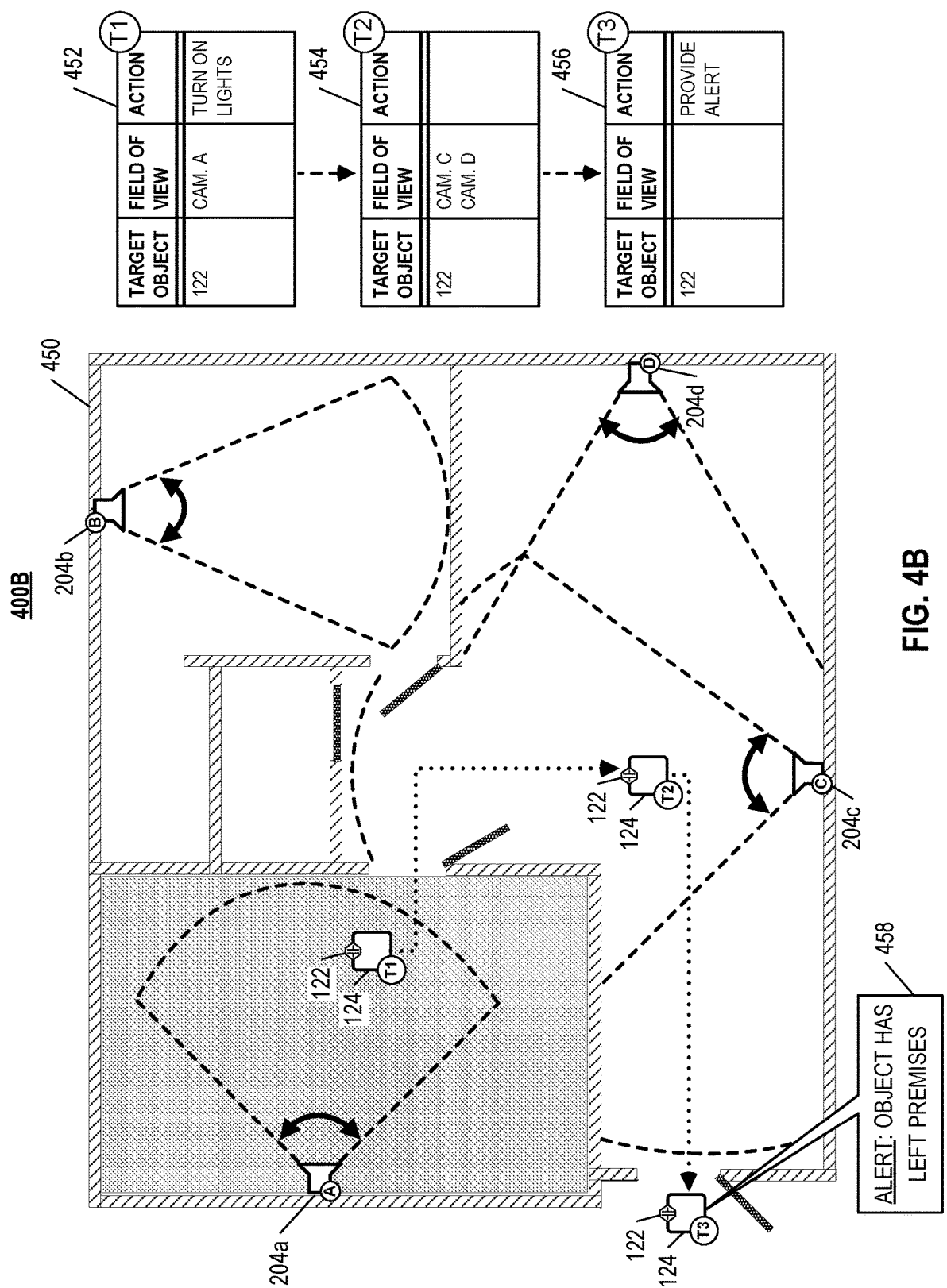
FIG. 4B illustrates a block diagram of an example property that includes multiple cameras capable of performing continuous target recording.

FIG. 4B illustrates an example property 450 that includes multiple camera units 204a-204d capable of performing continuous target recording. In addition, the property 450 may include a monitoring system such as the system 100 that is capable of performing processes 300 and 400A as described with respect to FIGS. 3 and 4A, respectively, using the multiple camera units 204a-204d. As described previously, the system 100 may be used to continuously monitor a target object 124 within the property 450. For instance, each of the multiple camera units 204a-204d have respective field of views (depicted using the dashed lines in FIG. 4A) that are used to determine when the target object 124 is visible to a particular camera unit from among the camera units 204a-204d. In some instances, the target object 124 may be attached to the beacon device 122, which is used by the multiple camera units 204a-204d to detect the presence of the target object 124 with the respective field of views In the example depicted in FIG. 4B, the target object 124 moves through the property 450 from a time point T1 to a time point T2 and a time point T3. The time points T1-T3 are depicted in FIG. 4A to demonstrate how movement of the target object 124 within different field of views associated with the multiple cameras 204a-204d impacts the continuous target recording by the system 100 within the property 450. For example, the time points T1, T2, and T3 may be associated with data tables 452, 454, and 456, respectively, to indicate the particular data collected by the system 100 at a particular point in time. The data tables 452, 454, and 456 may specify the target objects that are currently being monitored, the field of view where the target objects are visible, and triggered actions to be performed.

At the time point T1, the target object 124 is within a region of the property where the lights are off. As a result, the visibility of the target object 124 to the camera unit 204a may be limited. In this example, although the visibility of the target object 124 is limited, the camera unit 204a is able to detect the presence of the target object 124 based on detecting the presence of the beacon device 122 within a proximity of the camera unit 204a. As depicted in the data table 452, the system 100 detects that the target object 124 is located within the field of view associated with the camera unit 204a and indicates that the action to be taken is "TURN ON LIGHTS." In this example, in response to determining that the visibility of the target object 124 is limited for a camera unit 204a, the monitor control unit 110 may transmit an instruction to a connected light source 460 to turn on and improve the visibility of the target object 124 within the field of view of the camera unit 204a. In this regard, the system 100 may be used to dynamically control connected appliances within the property 450 to adjust the visibility of the target object 124.

At the time point T2, the target object has moved to a common area region of the property that is within the respective field of views of the camera units 204c and 204d. In this example, the data table 454 indicates that the target object is within the field of view of the camera units 204c and 204d. In response, in some instances, both of the camera units 204c and 204d may receive signals from the monitor control unit 110 to record their respective field of views such that the target object 124 is recorded from multiple viewing perspectives. Alternatively, in other instances, to prevent duplication of monitoring of the target object 124 at the time point T2, the monitor control unit 110 may instead select one of the camera units 204c and 204d to record the target object 124. In such instances, the monitor control unit 110 may use image analysis and recognition techniques, as described previously, to select the more suitable camera unit to record the target object within a respective field of view. For example, the monitor control unit 110 may select the camera unit 204d to record the target object 124 based on determining that the exit to the property 450 is visible within the field of view of the camera unit 204d. In another example, the monitor control unit 110 may select the camera unit 204c to record the target object 124 based on determining that the camera unit 204c is closer to the target object 124 relative to the camera unit 204d.

At the time point T3, the target object 124 has left the premises of the property 450. The monitor control unit 110 may determine that the target object has left the property 450. For example, in some instances where the respective field of views of the multiple camera units 204a-204d cover the entire property 450, the monitor control unit 110 may determine that the target object 124 has left the property 450 if it is not visible within at least one field of view. In another example, the monitor control unit 110 may determine that the target object 124 has left the property 450 based on the signal transmitted from the beacon device 122. For instance, as described previously, the beacon device 122 may be configured to exchange communications with the monitor control unit 110 such that after the beacon device 122 is a particular distance from the monitor control unit 110, the monitor control unit 110 may infer that the target object 124 has exited the property 450. In yet another example, the monitor control unit 110 may determine that the target object 124 has exited the property 450 based on sensor data collected by the sensors 120. For instance, sensors 120 may be placed on the entrances/exits of the property 450 and configured to log activity when objects and/or individuals cross a specified boundary associated with the entrances/exits. In such instances, the sensors 120 may detect that the target object 126 has crossed the specified boundary associated with the entrances/exits of the property and in response, transmit a signal to the monitor control unit.

In response to determining that the target object 124 has exited the property 450, the monitor control unit 110 may transmit an alert 458 indicating that the target object 124 is no longer within the property 450. For instance, the monitor control unit 110 may transmit the alert 458 to the one or more user devices 140, 150 so that individuals associated with the property 450 (e.g., property owners) can understand that the target object 124 may be at risk of theft. In other instances, the monitor control unit may transmit the alert 458 to the monitoring application server 160 in order to trigger an alarm event within the property 450.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    detecting, by a first camera at a property, a beacon signal transmitted by a beacon attached to a target object at the property, the beacon signal being (i) transmitted to communicate with one or more cameras installed at the property and (ii) detectable by the one or more cameras installed at the property;
    based on a detectability of the beacon signal, determining, by the first camera, (i) that the target object has moved to be outside a field of view of the first camera, immediately after being in the field of view of the first camera and (ii) that a proximity of the beacon to the first camera exceeds a threshold proximity;
    based on the target object being outside the field of view of the first camera and the proximity of the beacon exceeding the threshold proximity, triggering continuous monitoring of the target object at the property by continuously processing the beacon signal transmitted by the beacon attached to the target object;
    determining, using a monitoring server used to monitor the property, a plurality of coordinate locations of the target object specific to different rooms at the property based on the triggering of continuous monitoring of the target object;
    correlating, by the monitoring server over a predefined time period, each of the plurality of coordinate locations that are specific to each of the different rooms at the property;
    identifying, by the monitoring server, movement patterns of the target object based on each of the plurality of coordinate locations that are correlated;
    predicting, by the monitoring server, when the target object will enter and exit a respective field of view of each camera at the property based on each of the movement patterns of the target object;
    iteratively transmitting request signals between a first camera and a second camera at the property based on:
        i) control parameters transmitted, by the monitoring server, to the first and second cameras,
        ii) the plurality of coordinate locations, and
        iii) the predicting of when the target object will enter and exit a respective field of view for each camera;
    continuously visually monitoring the target object based on the request signals that are iteratively transmitted between the first camera and the second camera; and
    providing a current view of the first camera or the second camera for output.

2. The method of claim 1, wherein providing the current view of the first camera comprises transmitting, to the first camera, an instruction to provide data collected by the first camera.

3. The method of claim 2, wherein the instruction to provide data collected by the first camera comprises an instruction to tilt a position of the first camera such that the tilt adjusts a current field of view of the first camera.

4. The method of claim 1, comprising:
    storing the current view of the first camera.

5. The method of claim 1, comprising:
    determining that one or more individuals associated with the monitored property has returned to the monitored property; and
    in response to determining that the one or more individuals associated with the monitored property has returned to the monitored property, stopping continuous monitoring of the target object.

6. The method of claim 5, wherein the one or more individuals associated with the monitored property are designated by an authorized individual associated with the monitored property.

7. The method of claim 1, comprising:
    determining, based at least on the current view of the first camera, that the target object is no longer located within the monitored property; and
    in response to determining that the target object is no longer located within the monitored property, providing an alert indicating that the target object is no longer located within the monitored property.

8. The method of claim 7, wherein determining that the target object is no longer located within the monitored property is based at least on one of:
    determining, based at least on visibility of the target object within one or more current views of a plurality of cameras, that the target object has crossed a particular boundary defined by a geo-fence of the monitored property, wherein the geo-fence is enabled by a sensor at that property that communicates with one or more cameras at the property to transmit sensor data about the particular boundary associated with the geo-fence, or determining, based at least on the visibility of the target object within the current views of the plurality of cameras, that the target object has passed through a particular region of the monitored property associated with a property entrance or exit.

9. The method of claim 1, wherein:
the plurality of cameras are capable of detecting a plurality of target objects, and
the method comprises determining that respective locations of each target object of the plurality of target objects are visible within a respective field of views of the plurality of cameras based at least on a user-specified priority of each target object of the plurality of target objects.

10. The method of claim 1, comprising:
in response to providing the current view of the first camera, determining that the target object has limited visibility in the current view but is detected from the first camera being in wireless communication with the beacon based on the detected beacon signal; and
in response to determining that the target object has limited visibility in the current view but is detected from the first camera being in wireless communication with the beacon, transmitting an instruction to a light source to turn on.

11. The method of claim 1, wherein:
in response to determining that the target object has moved to be outside the field of view of the first camera, triggering a plurality of cameras at the monitored property, other than the first camera, to attempt to communicate with the beacon; and
receiving indications that the beacon has moved to be within a threshold proximity of the one or more cameras such that the beacon is in wireless communication with the one or more cameras, wherein receiving the indications comprises:
receiving, from each of two cameras of the plurality of cameras, a respective indication that the beacon has moved to be within a threshold proximity of the respective camera of the two cameras such that the beacon is in wireless communication with the respective camera.

12. The method of claim 1, comprising:
providing, for each of multiple periodic time intervals, a notification to a user device that summarizes rooms at the monitored property that the target object was located within for a respective periodic time interval and a length of time that the target object was in each room for the respective periodic time interval.

13. The method of claim 1, comprising:
determining that the target object and a second object that a user has specified has less priority to track than the target object are not both visible within a same field of view of a camera; and
in response to determining that the target object and the second object are not both visible within the same field of view of a camera, tracking the target object instead of the second object.

14. The method of claim 1, wherein:
obtaining the current view of the first camera comprises:
obtaining the current field of view of the first camera in response to determining that (i) a location of the target object is visible within the field of view of the first camera, (ii) the location of the target object is visible within a field of view of a third camera, and (iii) the respective field of view of the first camera includes an exit to the property.

15. The method of claim 1, wherein continuous monitoring of the target object while the target object is at the property comprises:
monitoring, by the first camera, the target object based on a request transmitted by the second camera, monitoring parameters that define continuous target monitoring, and respective fields of views of other cameras at the property.

16. The method of claim 1, wherein the target object is a pet that moves around to different rooms at the property and predicting comprises:
predicting when the pet will enter and exit a field of view of a respective camera associated with each of the different rooms at the property based on each of the movement patterns of the pet.

17. The method of claim 16, comprising:
generating, at a mobile device that communicates with the monitoring server, a graphical interface using a native application of the mobile device;
providing the current view of the first camera or the second camera as an output of the graphical interface; and
continuously visually monitoring the pet based on the current view that is provided as the output of the graphical interface.

18. The method of claim 17, comprising:
determining, by the monitoring server, a summary of each room at the property that the pet was located within for a respective periodic time interval;
determining, by the monitoring server, a length of time that the pet was in each room included in the summary for the respective periodic time interval;
based at least on the summary, generating, by the monitoring server, a notification that indicates each room the pet entered and the length of time that the pet was in the room; and
presenting, for each of the periodic time intervals, the notification as an output at the mobile device using the graphical interface of the native application.

19. The method of claim 18, wherein the property comprises at least two target objects corresponding to at least two pets and the method comprises:
for each pet: determining a respective priority of the pet based on a beacon signal transmitted by a respective beacon attached to the pet;
determining that a camera at the property is unable to capture video of both pets in a single field of view of the camera; and
adjusting a pan or tilt of the camera to visually monitor the pet having the higher priority after determining the camera is unable to capture video of both pets.

20. An electronic system comprising:
at least one processor; and
at least one computer-readable storage medium coupled to the at least one processor having stored thereon instructions which, when executed by the at least one processor, causes performance of operations comprising:
detecting, by a first camera at a property, a beacon signal transmitted by a beacon attached to a target object at the property, the beacon signal being (i) transmitted to communicate with one or more cameras installed at the property and (ii) detectable by the one or more cameras installed at the property;

based on a detectability of the beacon signal, determining, by the first camera, (i) that the target object has moved to be outside a field of view of the first camera, immediately after being in the field of view of the first camera and (ii) that a proximity of the beacon to the first camera exceeds a threshold proximity;

based on the target object being outside the field of view of the first camera and the proximity of the beacon exceeding the threshold proximity, triggering continuous monitoring of the target object at the property by continuously processing the beacon signal transmitted by the beacon attached to the target object;

determining, using a monitoring server used to monitor the property, a plurality of coordinate locations of the target object specific to different rooms at the property based on the triggering of continuous monitoring of the target object;

correlating, by the monitoring server over a predefined time period, each of the plurality of coordinate locations that are specific to each of the different rooms at the property;

identifying, by the monitoring server, movement patterns of the target object based on each of the plurality of coordinate locations that are correlated;

predicting, by the monitoring server, when the target object will enter and exit a respective field of view of each camera at the property based on each of the movement patterns of the target object;

iteratively transmitting request signals between a first camera and a second camera at the property based on:
i) control parameters transmitted, by the monitoring server, to the first and second cameras,
ii) the plurality of coordinate locations, and
iii) the predicting of when the target object will enter and exit a respective field of view for each camera;

continuously visually monitoring the target object based on the request signals that are iteratively transmitted between the first camera and the second camera; and providing a current view of the first camera or the second camera for output.

21. The system of claim 20, wherein providing the current view of the first camera comprises transmitting, to the first camera, an instruction to provide data collected by the first camera.

22. The system of claim 21, wherein the instruction to provide data collected by the first camera comprises an instruction to tilt a position of the first camera such that the tilt adjusts a current field of view of the first camera.

23. The system of claim 20, wherein continuous monitoring of the target object while the target object is at the property comprises:

monitoring, by the first camera, the target object based on a request transmitted by the second camera, monitoring parameters that define continuous target monitoring, and respective fields of views of other cameras at the property.

24. A non-transitory computer-readable medium storing software comprising instructions executable by one or more computers which, upon such execution, cause the one or more computers to perform operations comprising:

detecting, by a first camera at a property, a beacon signal transmitted by a beacon attached to a target object at the property, the beacon signal being (i) transmitted to communicate with one or more cameras installed at the property and (ii) detectable by the one or more cameras installed at the property;

based on a detectability of the beacon signal, determining, by the first camera, (i) that the target object has moved to be outside a field of view of the first camera, immediately after being in the field of view of the first camera and (ii) that a proximity of the beacon to the first camera exceeds a threshold proximity;

based on the target object being outside the field of view of the first camera and the proximity of the beacon exceeding the threshold proximity, triggering continuous monitoring of the target object at the property by continuously processing the beacon signal transmitted by the beacon attached to the target object;

determining, using a monitoring server used to monitor the property, a plurality of coordinate locations of the target object specific to different rooms at the property based on the triggering of continuous monitoring of the target object;

correlating, by the monitoring server over a predefined time period, each of the plurality of coordinate locations that are specific to each of the different rooms at the property;

identifying, by the monitoring server, movement patterns of the target object based on each of the plurality of coordinate locations that are correlated;

predicting, by the monitoring server, when the target object will enter and exit a respective field of view of each camera at the property based on each of the movement patterns of the target object;

iteratively transmitting request signals between a first camera and a second camera at the property based on:
i) control parameters transmitted, by the monitoring server, to the first and second cameras,
ii) the plurality of coordinate locations, and
iii) the predicting of when the target object will enter and exit a respective field of view for each camera;

continuously visually monitoring the target object based on the request signals that are iteratively transmitted between the first camera and the second camera; and providing a current view of the first camera or the second camera for output.

* * * * *